(12) United States Patent
Moore

(10) Patent No.: US 7,692,658 B2
(45) Date of Patent: Apr. 6, 2010

(54) MODEL FOR LAYOUT ANIMATIONS

(75) Inventor: Kevin R. Moore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 609 days.

(21) Appl. No.: 11/601,543

(22) Filed: Nov. 17, 2006

(65) Prior Publication Data

US 2008/0120534 A1      May 22, 2008

(51) Int. Cl.
*G06T 15/00* (2006.01)
(52) U.S. Cl. .................. 345/473; 345/474; 345/475; 715/757; 715/760
(58) Field of Classification Search .......... 345/473, 345/474, 375, 475; 715/757, 760
See application file for complete search history.

(56) References Cited

U.S. PATENT DOCUMENTS

| | | | |
|---|---|---|---|
| 5,570,462 A | 10/1996 | McFarland | |
| 5,907,330 A * | 5/1999 | Simmers | 345/542 |
| 5,933,150 A * | 8/1999 | Ngo et al. | 345/473 |
| 6,215,502 B1 | 4/2001 | Ferguson | |
| 6,784,901 B1 * | 8/2004 | Harvey et al. | 715/757 |
| 6,931,656 B1 * | 8/2005 | Eshelman et al. | 725/37 |
| 6,941,521 B2 | 9/2005 | Lin et al. | |
| 6,957,392 B2 | 10/2005 | Simister et al. | |
| 7,065,712 B2 * | 6/2006 | Muto et al. | 715/760 |
| 2002/0116418 A1 | 8/2002 | Lachhwani et al. | |
| 2003/0217121 A1 | 11/2003 | Willis | |
| 2004/0014013 A1 | 1/2004 | Diesel et al. | |
| 2004/0177327 A1 | 9/2004 | Kieffer | |
| 2005/0046630 A1 | 3/2005 | Jacob et al. | |
| 2006/0090139 A1 | 4/2006 | Jenni et al. | |
| 2006/0195794 A1 | 8/2006 | Sun et al. | |
| 2006/0218489 A1 | 9/2006 | Ovetchkine et al. | |

OTHER PUBLICATIONS

Luders, et al., "Research Report: Improving Browsing in Information by the Automatic Display Layout", Date: Oct. 30-31, 1995, pp. 26-33, http://doi.ieeecomputersociety.org/10.1109/INFVIS.1995.528683.

Maloney, et al., "Directness and Liveness in the Morphic User Interface Construction Environment", Date: 1995, pp. 21-28, ACM Press, NY, USA, http://delivery.acm.org/10.1145/220000/215636/p21.maloney.pdf?.

* cited by examiner

*Primary Examiner*—Phu K Nguyen

(57) ABSTRACT

Described is a technology (e.g., in Windows® Presentation Foundation) by which user interface elements are reconfigured into a new configuration, with at least some of the elements transitioned from between configurations in an animated manner. To animate, elements have interim data computed therefor between the first configuration and the new configuration over a series of frames. As frames are rendered, the interim layout data provides an animation effect, which may be movement via interim coordinates, resizing via interim size data, and fading in or out via interim opacity data. The layout system may defer computationally expensive layout operations until the elements are in the second configuration. If an element's size is not at least a minimum, that element's visualization may be changed. If an element's content does not fit, a priority among pieces of the content may determine which piece or pieces will be shown.

20 Claims, 9 Drawing Sheets

MODEL FOR LAYOUT ANIMATIONS

BACKGROUND

When designing a user interface for graphical applications, a problem is that the same user interface elements may be displayed in a variety of configurations. For example, a drawing area such as a page or the like in which the user interface elements appear may be resized, whereby the elements need to be redrawn in the new size. A layout may change orientation from vertically stacked elements to a horizontal arrangement, or vice versa, for example, requiring a redrawing operation. Further, an element may add, delete or rearrange the information that it needs to display, requiring a redrawing operation. A designer needs to consider these many various configurations.

To provide a pleasant user experience to a user viewing the arranged elements, designers may want to have some appealing transition effect between the previous and new configurations. For example, instead of simply lurching from one configuration to another when a user resizes the element drawing area, or when an item is added or removed from an element, transitioning in an animated fashion may be desired. However, to resize certain elements such as text elements requires-computationally expensive layout operations. If a fair number of these operations need to take place during an animation operation, the animation smoothness suffers, which does not provide an appealing user experience.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a set of user interface elements are reconfigured into a new configuration, with at least some of the elements transitioned from a first configuration to the new configuration in an animated manner. For example, the first to second configuration change may correspond to a layout to layout change, resizing a panel, and/or having changed data as a result of sorting and/or filtering operations.

Each element has first layout data corresponding to an initial laid out state of a first configuration, and second layout data is determined for each element in the set of elements in the new configuration corresponding to a final laid out state. At least some of the elements are transitioned from their initial laid out state to their final laid out state, including by determining interim layout data corresponding to each frame of a series of frames, such that as frames are rendered, the interim layout data provides an animation effect. Transitioning may include computing interim location coordinates as the interim layout data to provide animated movement of elements, computing interim size data as the interim layout data to provide animated growing or shrinking of elements, and/or computing interim opacity data as the interim layout data to provide animated fading in or out of one or more elements.

In one example implementation, a control computes interim layout data for elements between an initial laid out state corresponding to a first configuration and a final laid out state corresponding to a second configuration. Rendering means coupled to the control outputs a series of frames based upon varying interim layout data from the control to provide a visible representation of animation of at least some of the elements between the first and second configurations. The control may obtain target layout data corresponding to the final laid out state from a selected one of a set of pluggable layout algorithms. The control may comprise a dynamic panel control in a Windows® Presentation Foundation environment, and with layout algorithms comprising dynamic panel layout components. Also, the system may defer computationally expensive layout operations until the elements are in the second configuration.

Thus, upon receiving a request to reconfigure a set of elements into a new configuration, with each element of the set having first layout data corresponding to an initial laid out state, second layout data is determined for each element corresponding to a final laid out state. At least some of the elements are transitioned from their initial laid out state to their final laid out state, including determining interim layout data corresponding to each frame of a series of frames such that the interim layout data provides an animation effect. In one example, if the available size of an element is not at least a minimum size, that element's visualization is changed. In another example, if the content of that element does not fit within an element, the element's content is adjusted based upon a priority among pieces of the content, such that prioritized lesser amount of the content will be rendered in the element.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards laying out a configuration of elements on an element drawing area, in which the configuration needs to change in some way. Some of the description herein uses examples directed towards a resizing operation of an element display area, such as a page or application program window, however it should be understood that is only one operation for which a reconfiguration is needed. Other examples of reconfiguration include an element's content changing, such as an item being removed or added as a response to a filtering operation, an item being moved during sorting, and so forth.

Further, the examples are described herein in a Windows® Presentation Framework environment, generally comprising a Windows® operating system subsystem that unifies the creation, display, and manipulation of user interfaces, documents, and media. However, as will be understood, this is only one suitable environment, and the technology described herein may provide benefits in many other environments and scenarios.

As such, the present invention is not limited to any particular embodiments, aspects, concepts, structures, functionalities and/or examples described herein. Rather, any of the embodiments, aspects, concepts, structures, functionalities and/or examples described herein are non-limiting, and the present invention may be used various ways that provide benefits and advantages in computing and presenting content to users in general.

Figure 1:
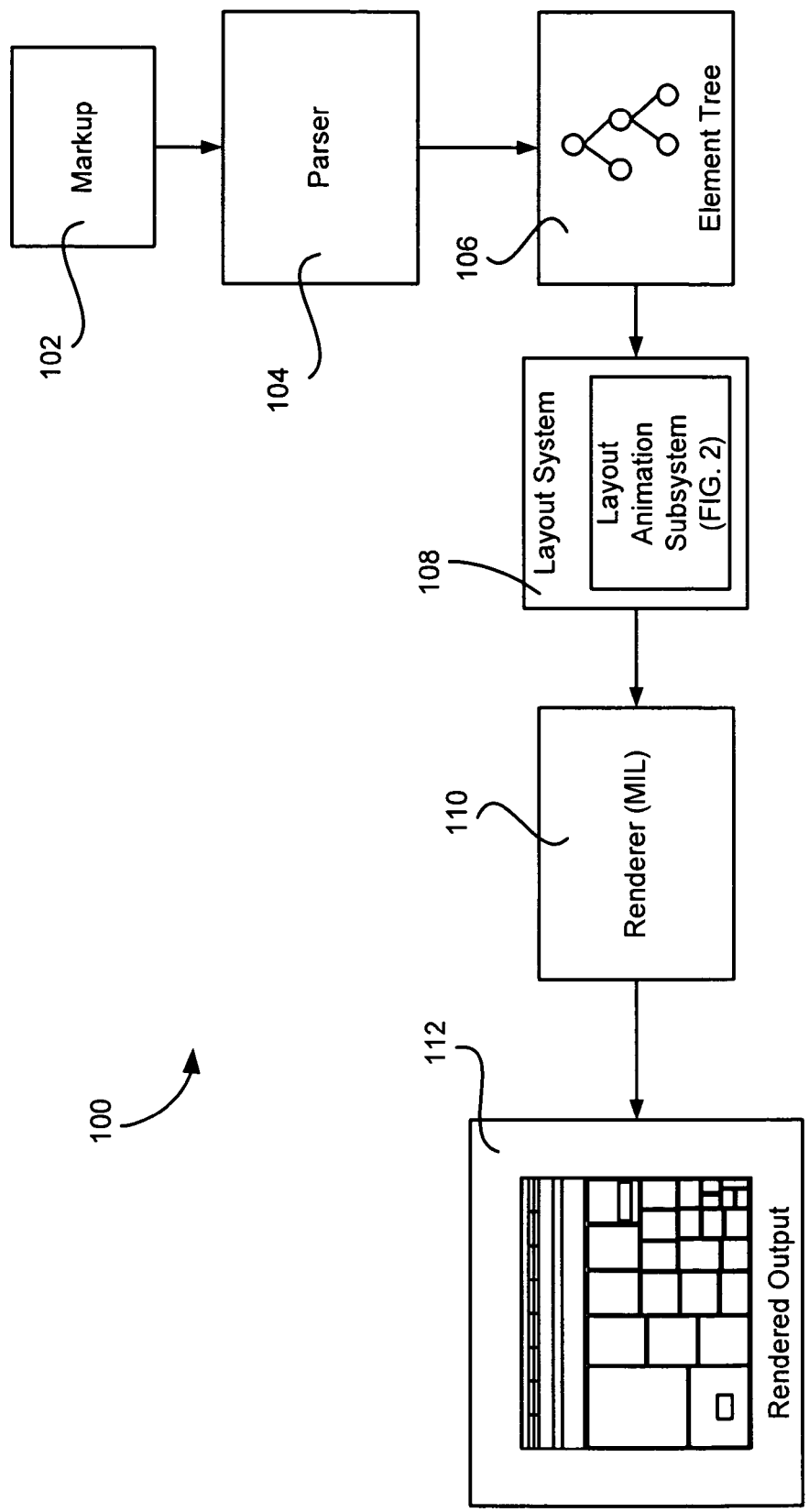
FIG. 1 is a block diagram representing an example environment for providing a layout animation subsystem.

Turning to FIG. 1, there is provided an example architecture 100 for rendering user interface elements. In general, a designer provides code (e.g., markup 102 of a suitable markup language) to cause user interface elements to be rendered as specified. For example, via markup, a designer may specify that a text box should appear on the screen with certain parameters such as color, border, text and/or other appearance information.

From this markup 102, a parser 104 constructs an element tree 106 of elements. The tree may have a number of parent and child elements, and a parent may be a container for one or more child elements, e.g., a parent menu bar may have child icons positioned therein. A child may be a parent of another child.

In the example architecture of FIG. 1, a layout system (or subsystem) 108 is provided to remove much of the complexity of managing user interface element behavior from the designer. For example, the layout system 108 typically handles conflicts that may exist between what space a parent has available for a child, and the child's requirements. For example, for a child element that is constrained by its parent's available size, the layout system 108 may handle the result in a consistent and uniform way in an attempt to optimize space usage. Similarly, when a child is smaller than space provided by the parent, the layout system 108 may position the child in an orderly way that is consistent and uniform across element types.

In one implementation, sizes are produced from "measuring" and positioning is done through "arranging," which each occur in distinct phases. In general, the layout system 108 processes calls in the element tree directed from parent elements (e.g., containers) to child elements, and may thus handle a number of sizing and positioning issues, e.g., in a uniform way. For example, if a child requests more space than is available in a parent's UI element, the layout system 108 is able to resize and position the child content in a uniform way without the parent or child having to deal with resizing and repositioning rules. Children and parents do not have to deal with margin adjustments, layout alignment, clipping, transformations and so forth, which are handled by the layout 108, which determines sizes and positions of user interface elements.

Once layout decisions are made in the layout system 108 and the elements in the element tree 106 are properly configured, a renderer component 110 (of a media integration layer, or MIL) takes data from the element tree 106, including the sizes and positions, drawing primitives and other information, and renders the user interface elements to a suitable display. For example, in FIG. 1, the rendered output 112 includes a page of buttons, text boxes and images as the user interface elements, which are rendered representations of elements in the tree.

However, measure and arrange are relatively computationally expensive operations. Thus, for one aspect of animation as described herein, such operations are basically deferred until animation has completed. Instead, during an animated transition, layout is handled by a layout animation subsystem (FIG. 2), apart from the conventional layout system controls. This allows rendering of elements to occur with temporary locations, sizes, and/or other (e.g., opacity) properties in each frame between the start and end of animation. When the animation completes and the application becomes idle, the computationally expensive measure and arrange layout operations are performed to finalize the elements' appearance.

Figure 2:
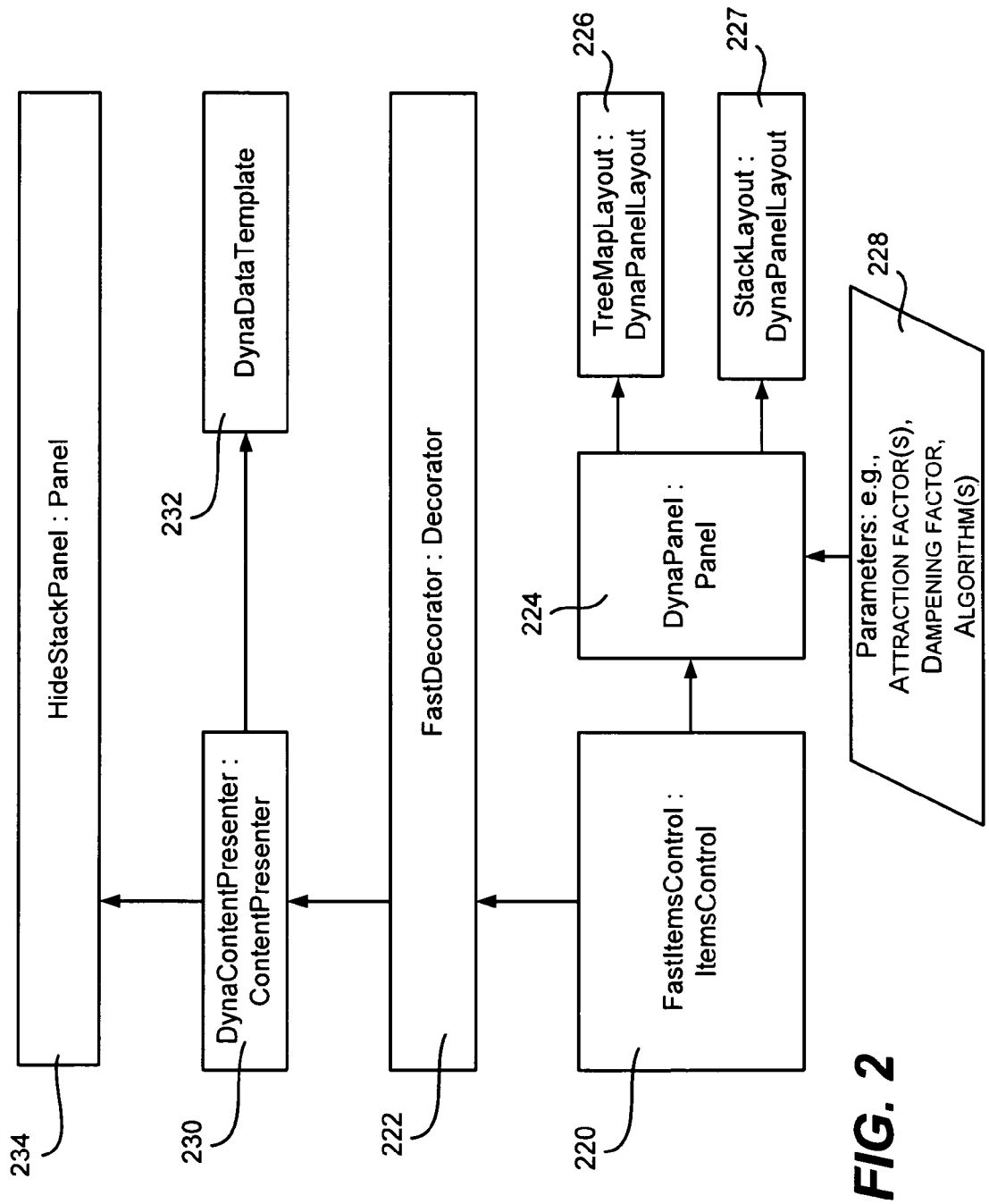
FIG. 2 is a block diagram representing components of an example layout animation subsystem.

To perform animated transitions in this manner, a number of layout animation subsystem controls (objects) are provided, as generally represented in FIG. 2. More particularly, FastItemsControl 220 is an ItemsControl having a special container type, namely FastDecorator 222. Note that the existing Windows® Presentation Foundation ItemsControl is a control having an ItemsSource property; when the ItemsSource property is set, the ItemsControl generates the UI elements (containers) defined by its property values (e.g., GetContainerForItemOverride). Once generated, these containers need to be placed in the drawing area, and in particular, in a panel. To this end, it is part of the contract for ItemsControl that a panel (e.g., a StackPanel or TreeMap panel) is provided into which the containers are placed, e.g., by setting a property or by defining it in a template.

FastItemsControl 220 is similar to the existing ItemsControl in Windows® Presentation Foundation, but defines FastDecorator 222 as the container type. In general, FastDecorator 222 provides a set of functionality that defers measure and arrange layout operations until the application is idle. To this end, measure and arrange layout operations are requested by FastDecorator 222 as required to finalize the elements' appearance, but at a low priority. When an element calls FastDecorator 222 in the measure phase, the measure call is returned right away, with a low priority measure call sent to the dispatcher for conventional measuring. The arrange call to FastItemsControl is handled by DynaPanel 224, as described below.

As a result, when text elements are resized which would ordinarily require expensive layout operations, for example, the measure calls for those elements instead are returned right away without an actual measure operation. The actual measure operations only occur after the dispatcher has handled higher priority operations, which include drawing the interim states that are part of animating a transition, as described below, until the animation has completed and the lower priority operations handled. Deferring via FastItemsControl 220 and FastDecorator 222 thus ensure that the data items that are generated and rendered animate smoothly, while ensuring the layout eventually happens.

In the example of FIG. 2, the element that provides the animation is DynaPanel, e.g., an abstract base class. In a Windows® Presentation Foundation implementation, DynaPanel extends the Panel baseclass to enable layout-to-layout animations, as well as to provide animations for resizing, sorting, and filtering operations. Layout-to-layout animations are possible because DynaPanel allows pluggable layout algorithms, unlike other panels in which there is one layout algorithm per panel, e.g., StackPanel lays elements out in a stack, DockPanel docks elements, and so forth. Two example pluggable layout algorithms are represented in FIG. 2, namely TreeMapLayout 226 and StackLayout 227.

In general, the DynaPanel 224 includes a process computes temporary properties for each of its children, which are laid out and rendered, and which change over time (corresponding to some number of frames) to provide an animation effect. DynaPanel 224 allows an arbitrary number of arbitrary layouts to be used and switched at once, while providing animated transitions between the different layouts.

When a panel changes size as part of a resize, the layout of the panel's children almost always changes. DynaPanel 224 provides animations for these changes, based on a number of inputs including the number of children and a total size into which the children can be laid out.

Figure 3:
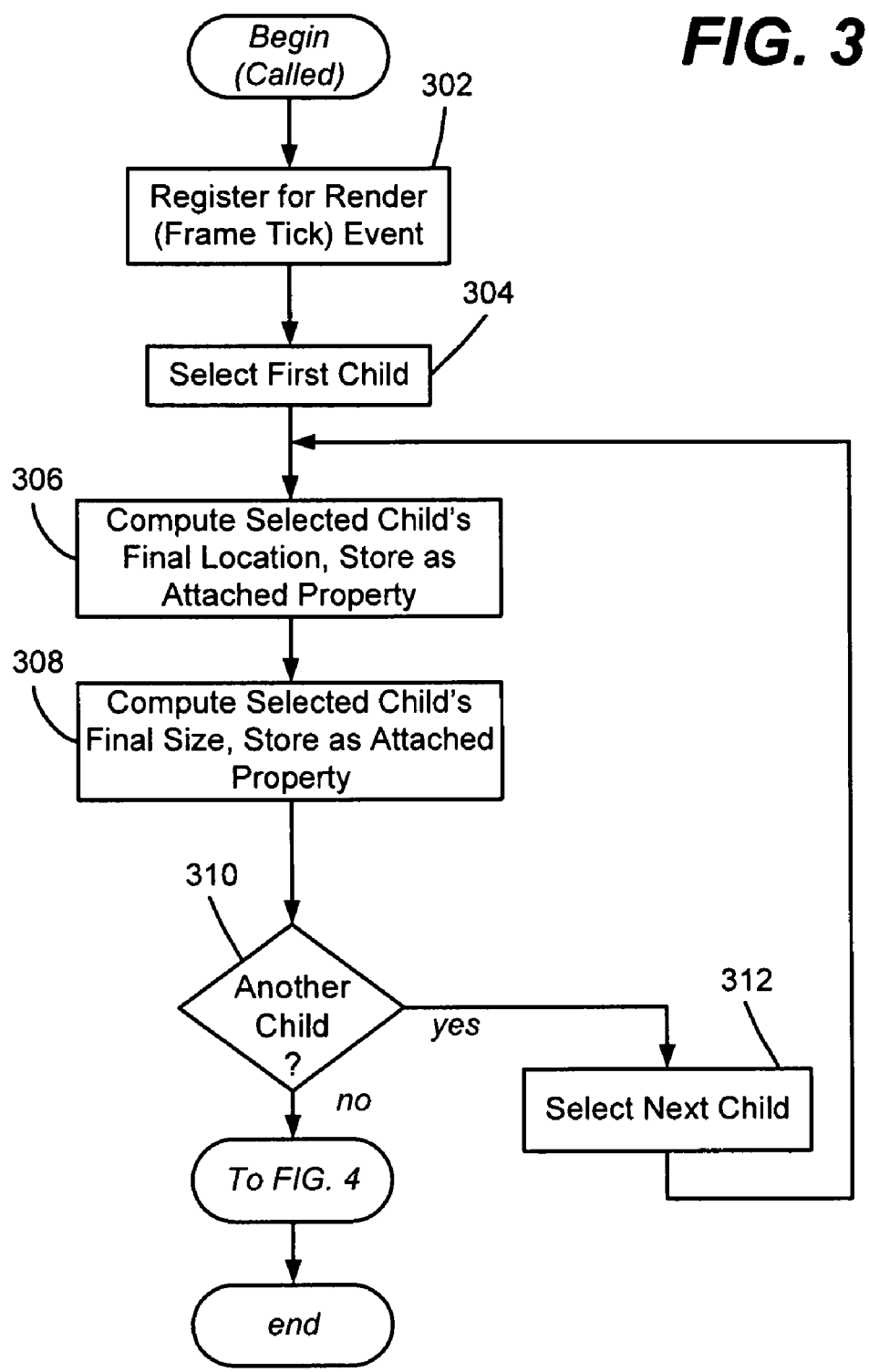
FIGS. 3 and 4 comprise is a flow diagram representing example steps to change child element's layout data with interim data to animate movement and size of child elements between first and second configurations.
Figure 4:
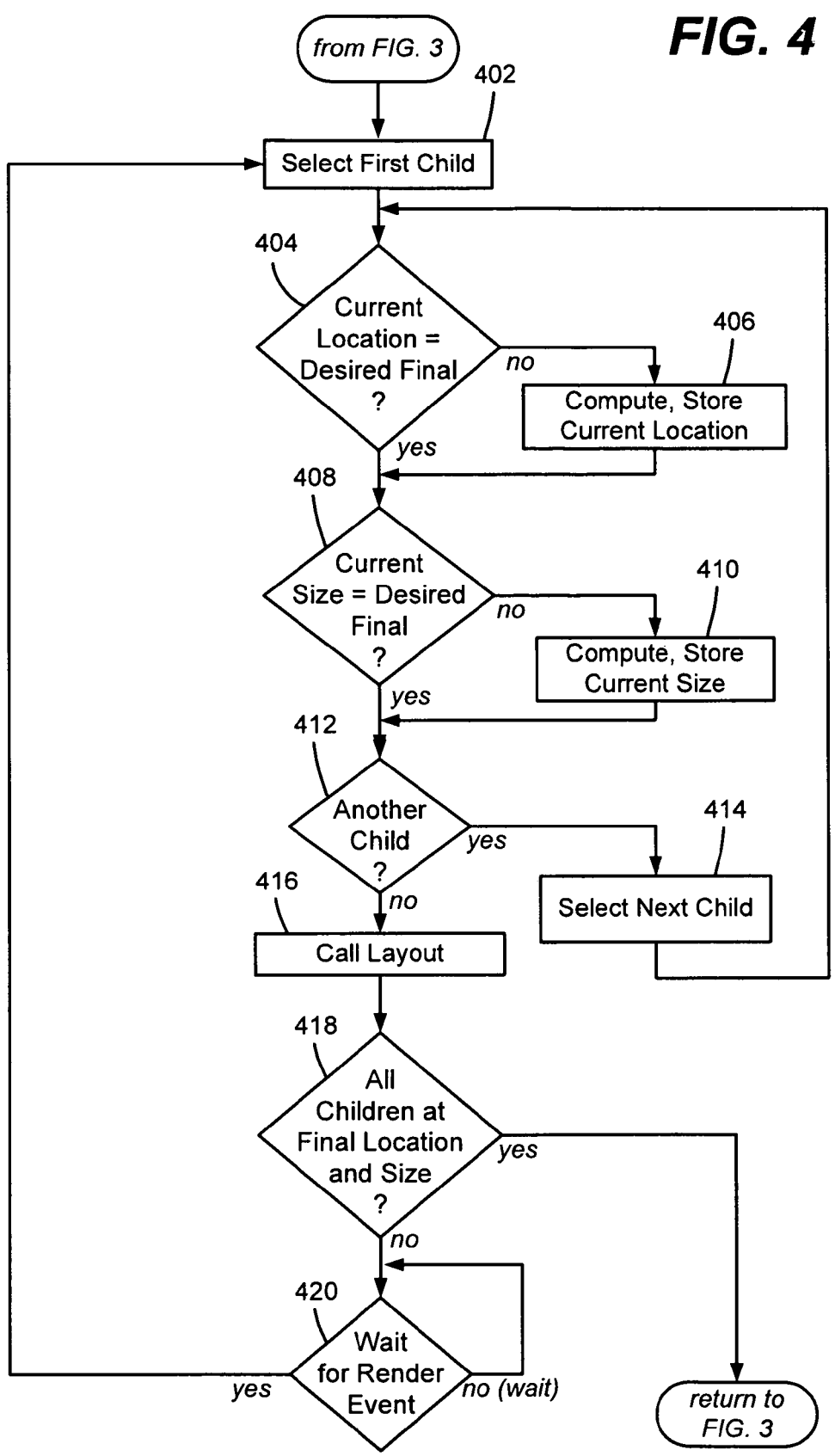

To this end, various example steps are performed to accomplish the animation. FIGS. 3 and 4 are directed towards changing the location and size of child elements, such as in response to a panel resize operation.

When called to perform a resize animation, as represented by step 302, the DynaPanel process registers for callbacks on rendering events. More particularly, once registered, each time a frame is rendered, a render event is sent to the DynaPanel process, whereby the DynaPanel process can synchronize itself with the frame rate of the graphics system.

Step 304 selects a first child element. Step 306 computes the selected child element's final layout location, while step 308 computes its final layout size. In one example implementation, these steps are accomplished via a call to the appropriate DynaPanelLayout, e.g., 226 or 227, each of which lay out the elements based on its respective type. However, rather than set the current location and size values for this element to the final target locations and sizes returned by DynaPanelLayout, these values are stored by the DynaPanel process, e.g., each as an attached property of the element.

Steps 310 and 312 repeat these computation and storing operations for each of the children. This results in a target location and size for each; animation will adjust the properties over time until each element achieves its target location and size. Example steps such as those set forth in FIG. 4 are performed to animate the child elements.

At step 402 of FIG. 4, a first child element is selected, and at step 404 that element's properties are evaluated to determine whether it is at its final desired location. If so, then it does not need to change its location, and the process branches to step 408. Otherwise, a new, temporary location is computed at step 406 based on a movement algorithm, essentially interpolating a new element location as a function of the change in time since the animation began. This location is stored among the layout data in the elements' attached properties.

Steps 408 and 410 perform a similar operation but instead of changing the child element's location, changes the element's size based on a resizing algorithm. The resizing algorithm interpolates a new, temporary size as a function of the change in time since the size animation began. This size is stored among the layout data in the elements' attached properties.

Steps 412 and 414 repeat the location and size computations for each other child element. When each element has its new size and position, a layout process (the arrange phase) 416 is called, whereby these elements are rendered at their temporary computed locations and size in the next rendered frame.

Unless all children have reached their final locations and sizes (step 418), the animation computations will be re-run when the render event is received, as represented by step 420; (note that step 420 is represented as a loop, but in actuality may be event driven.) In this manner, each frame is rendered with elements having temporary locations and sizes, which transition over a series of frames to their final locations and sizes. The perceived animation is smooth, because the expensive measure and arrange layout operations are not performed until the final locations and sizes have been achieved. Note that movement and resizing vectors (e.g., location speed and size speed) can be stored with each element (as part of its layout data) to facilitate the computation process.

As described above, steps 410 and 414 refer to movement and resizing algorithms. One suitable algorithm (for movement and resizing) uses attraction and dampening factors to compute new locations and sizes. To this end, a new position and size can be computed by using the distance squared (or inverse squared) from its final location (or size) to compute a velocity; the velocity, in conjunction with the change in time determines the new position or size. In other words, via a power of two computation, the element can accelerate (or decelerate) towards its new location, and grow or shrink in an accelerated (or decelerated) manner. In the event the computed position and/or size goes beyond the final settings, the next computation bounces the element back towards its final values, e.g., attracts the element back towards its final destination or size. A dampening factor can be applied to gradually settle the position and/or size to achieve the final values. Further, a terminal velocity can be enforced to ensure that elements do not change properties too quickly.

Although virtually any formula can be used for location and/or position, and indeed the selected formula or formulas may be configurable, it has been found that computations matching those that naturally occur, such as one based on distance squared, provide a satisfying user experience. Note that the designer can set some or all of the parameters, e.g., via sliders for the attraction factor and for the dampening factor (and possibly the total animation time to settle), whereby a designer can choose to have elements move and/or resize slowly or quickly, and/or dampen to settle slowly or quickly towards their final values. In FIG. 2, these inputs are represented as optionally configurable parameters 228.

Note that a parent can call into its children to obtain its attached properties. For example, the area of an element may be obtained, thereby assisting in layout operations.

Another aspect of layout animation involves changes to an element that occur as a result of sorting and/or filtering operations. Note that sorting and filtering operations are supported by ItemsControl, and result in changing the order and/or number of containers placed into a panel/items in an element. However, there is no animation effect with conventional ItemsControl sorting and filtering.

To provide animated sorting and filtering operations, DynaPanel supports IsHidden and Sort Priority properties. During its layout operations, DynaPanel uses these properties to determine how (or if) to place items of a data collection.

In one example implementation, when an ItemsControl (e.g., FastItemsControl) sorts a data collection and the Sort Priority on an item changes, DynaPanel reruns layout, but does so in a manner that animates the transition of the elements to their new order. For example, once the final location of each element is known from layout following a sort operation, animated movement logic, such as that similar to that of FIG. 4, can be used to transition each element's position within its parent container until the sort order is shown in its final state. Alternatively, individual items, pairs of items, or other subsets of the items can be separately moved in a manner that shows position changes over time until the sort order is shown in its final state. During animation, an element's opacity or other properties can be set such that elements can overlap yet still remain visible, and/or can be shown moving around (e.g., to the right, up and then back left to replace an element that has moved left and down), and so forth.

Filtering is another aspect supported by DynaPanel 224. In general, filtering can change the number of data collection elements to display in a container, typically adding one or more or deleting one or more. Filtering can be used in conjunction with sorting.

One way in which DynaPanel 224 can animate filtering is to fade in newly included elements and fade out any excluded elements that result from a requested filtering operation. To this end, when filtering occurs on a data collection, each item has a property, e.g., called IsHidden, which the filtering operation sets to indicate whether the element is to be shown or not.

In general, if IsHidden changes on an element, DynaPanel 224 will fade in or fade out the item, and move the other items around to compensate. However, it is understood that other animation concepts, such as flying in an added item, and flying out a removed item, may alternatively be performed, (or performed in addition to fading animation).

Figure 5:
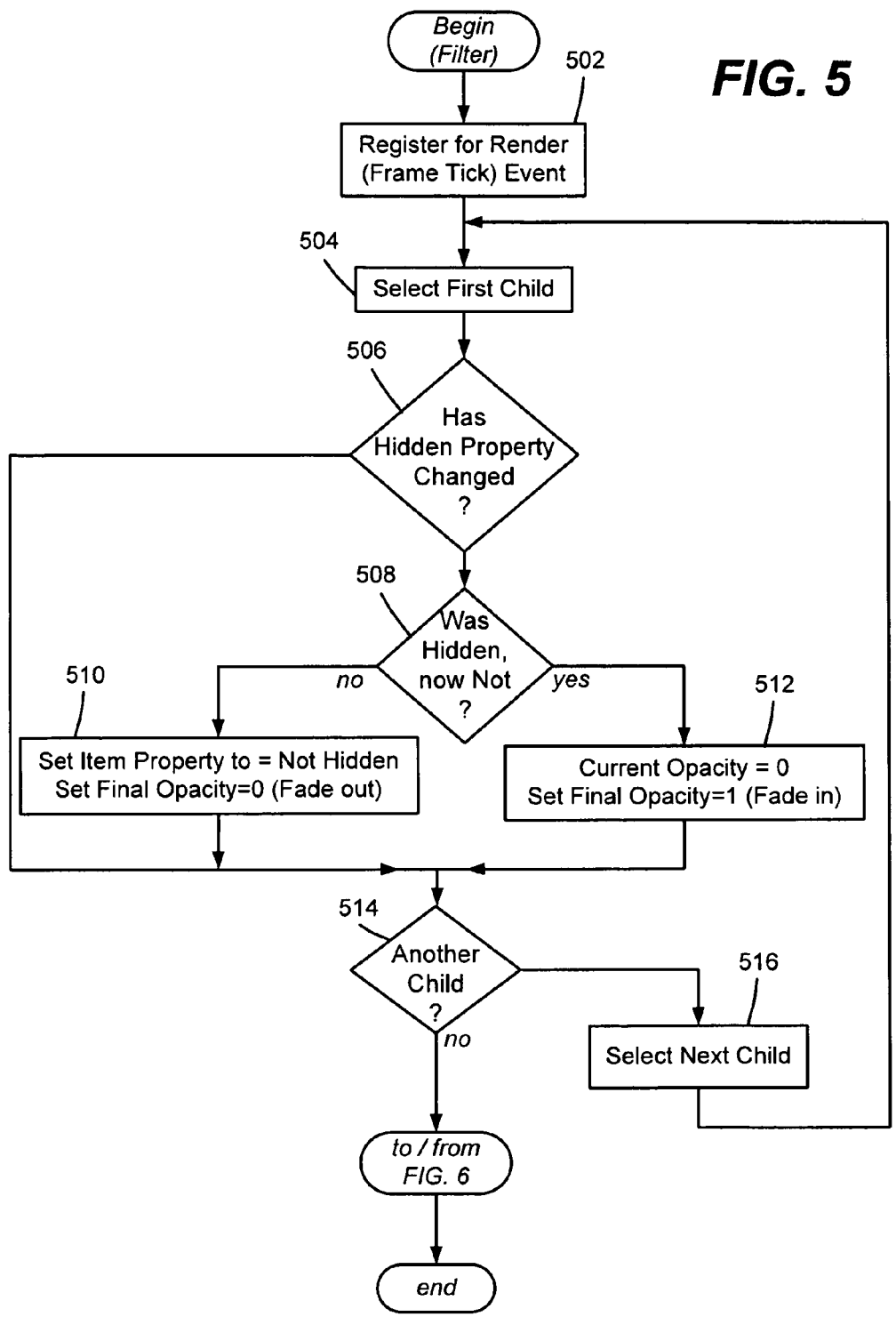
FIGS. 5 and 6 comprise is a flow diagram representing example steps to change child element's opacity data with interim data to animate fading in or fading out child elements between first and second configurations.
Figure 6:
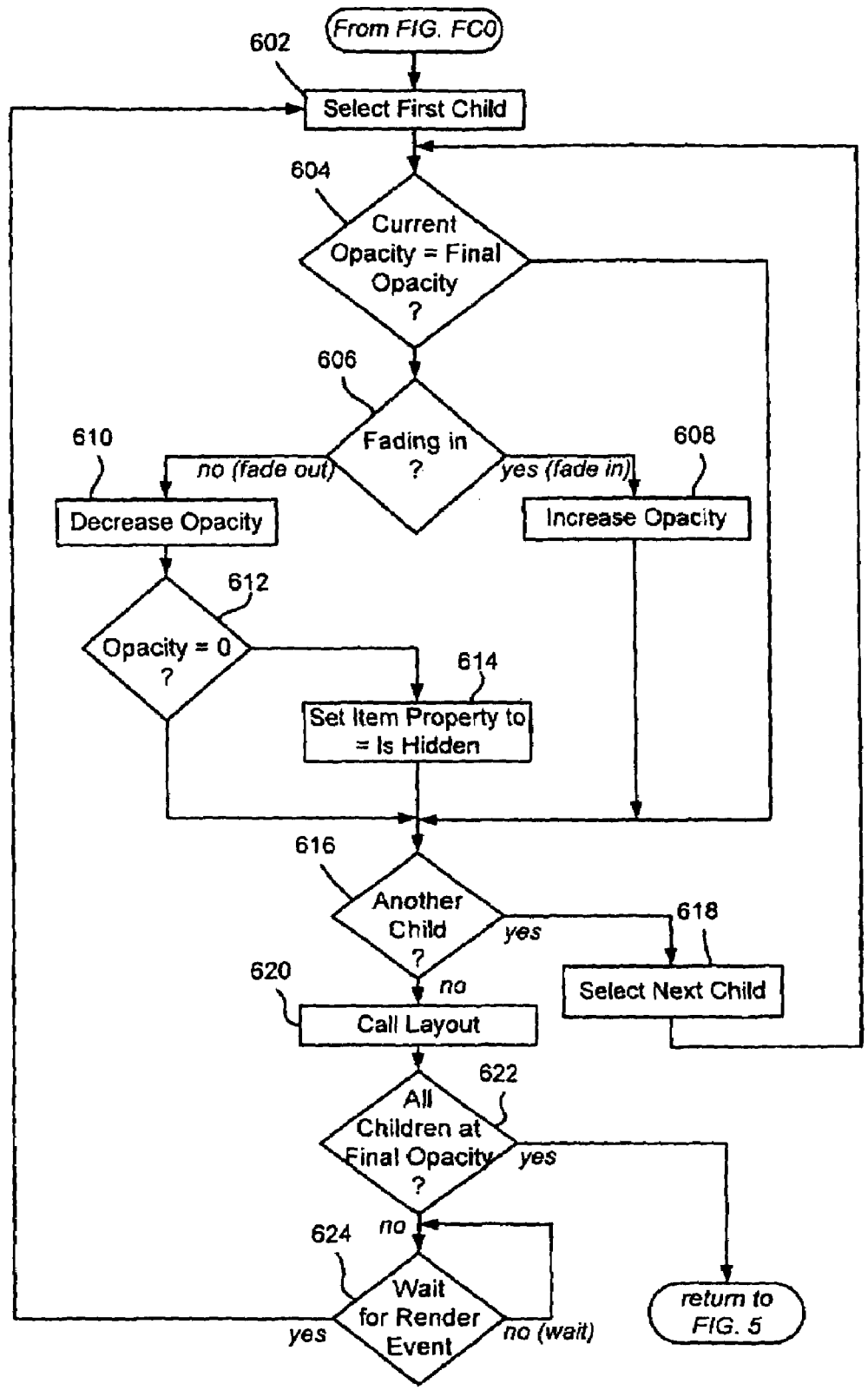

In one example implementation, the example logic of FIGS. 5 and 6 show how such an animation effect may be accomplished when DynaPanel 224 is called as a result of a filtering operation, beginning at step 502 which represents registering for callbacks on each frame tick as described above, (unless already registered).

Step 504 selects a child, and step 506 evaluates whether the IsHidden property has changed on that child. If not, the next child is selected via steps 514 and 516.

If the property has changed, step 508 determines whether to fade in or fade out the element, depending on which way the transition is occurring. If fading out, at step 510 the IsHidden property is set so that the item will still be shown temporarily, with a final opacity value set to zero for the target opacity. If fading in, space for the element will be created in the rendered data collection at the next layout; at step 512, the element's current opacity is set to zero, and its target opacity set to one. The process repeats for each child element via steps 514 and 516.

Once the targets are set up for each changed child, the opacity is animated, such as via the example steps of FIG. 6, e.g., by selecting a first child at step 602. Step 604 evaluates whether the current opacity is at its final target; if so, this item need not be processed further, and step 604 branches to step 616 and 618 to handle any other changed child elements. Note that elements that existed in the filter set both before and after thus remain intact with respect to opacity.

If the element is being faded in or faded out, step 606 determines which, e.g., whether moving towards an opacity of zero or one as its target. If fading in, at step 608 the opacity is increased via some time-based formula, e.g., linear, exponential, and so forth, to a maximum of one. If fading out, at step 610 the opacity is decreased via some amount (to a minimum of zero) according to a time-based formula, which is typically but need not be the same time-based formula for fading in. Note that the increase and/or decrease need not be always in one direction, e.g., the increase or decrease can temporarily be more or less opaque, such as by adding or subtracting some random amount, (but tracking the pre-random value for the next iteration), giving the appearance of flickering towards its final state.

If fading out, step 612 determines whether the opacity has reached zero. If so, this item no longer will be animated to fade out, but rather will be removed from the displayed container. To this end, step 614 restores its IsHidden property to no longer display upon the next layout.

Steps 616 and 618 repeat the process for the other children, leaving them intact if unchanged or fading them in if added or out if deleted towards a final opacity. Once all the children have been handled, layout is called via step 620. Note that this will remove any child that was changed to IsHidden via step 614, or add any newly included child that is being faded in. The movement of items as a result of addition or removal can be animated, e.g., using the movement animation logic as described above.

If all children have reached their final opacity, (step 622) then the animation process has completed. Otherwise, via step 624, the next render event re-triggers the animation process for the next animation interval, further moving any changing opacity values towards their target.

In the above described manner, changes due to re-sizing, sorting and filtering may be animated. At times, however, rearranging elements is not sufficient for certain applications, regardless of how complex the animation between the previous and newly rearranged configuration.

For example, when resizing, not every element may fully fit on the resized drawing panel. Typically, layout handles this by shrinking some elements according to rules, and providing scrollbars and the like by which a viewer can manipulate the content in an element. Alternatively, the contents of an element may be clipped. However, in an application where scrollbars and clipping are not desired, an element below some minimum size cannot be rendered without clipping or scrolling.

To handle such elements, DynaContentPresenter 230 (FIG. 2) is provided. Note that ContentPresenter (a component in Windows® Presentation Foundation) allows a developer to define different data templates for different data types or even different instances of the same data type. However, ContentPresenter does not allow a developer to change the template used based upon the size of the control.

DynaContentPresenter supports a collection of DataTemplates with an associated size or area (e.g., called DynaDataTemplate 232). When DynaContentPresenter changes size, DynaContentPresenter 230 goes through its template collection 232 and picks the template that corresponds to the current size. In essence, this allows an element to be changed to something else based on its size. For example, an item visualization may be changed to a logo when the size available is too small for the element's content.

Figure 7:
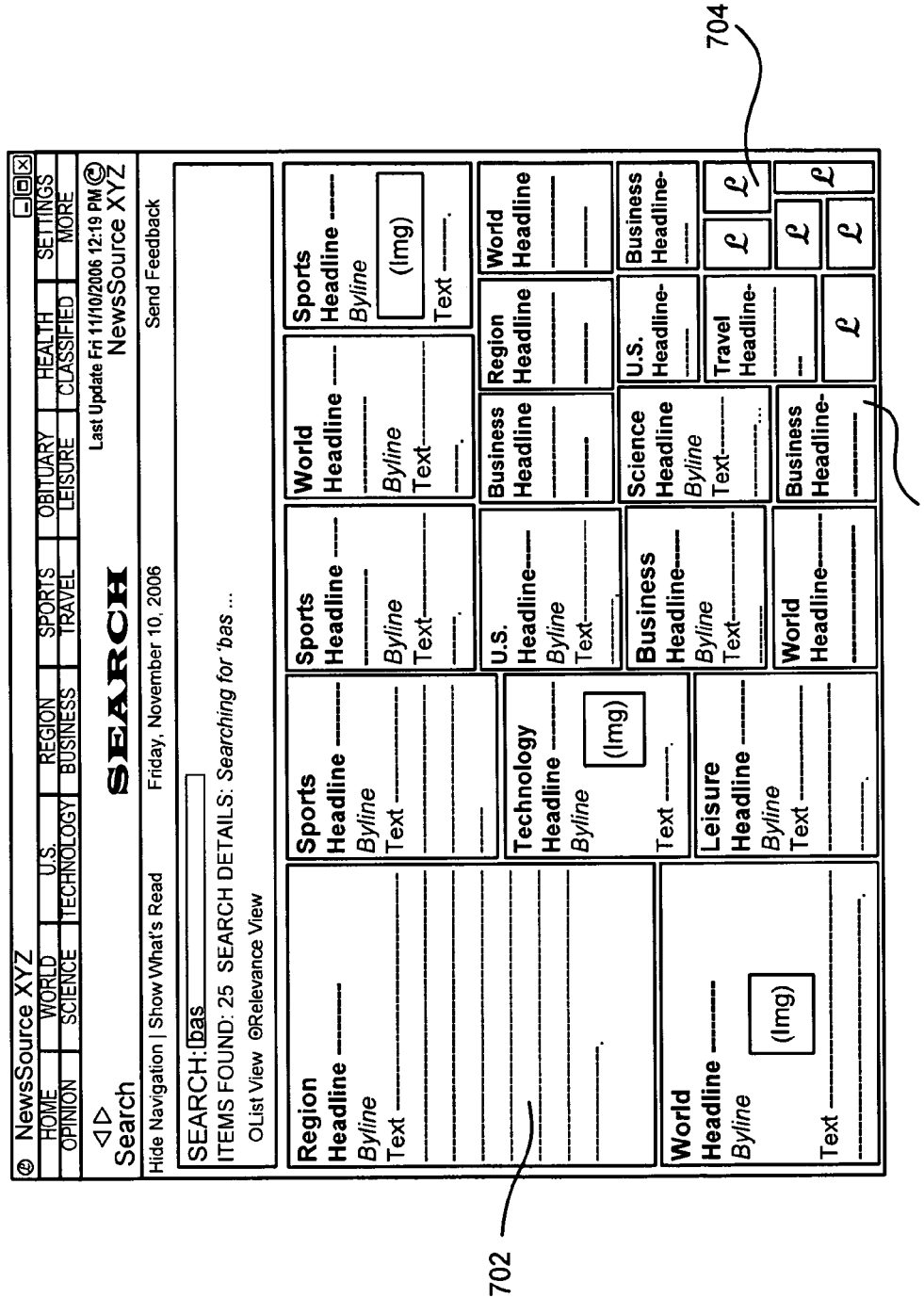
FIG. 7 is a representation of laid out elements in a first configuration.

FIG. 7 provides an example of this concept, in which elements (e.g., the element 702) display section headings, a headline, a byline, and accompanying text, possibly along with an image. However, if an element such as the element 704 is below a certain size, the template substitutes a logo image (e.g., the script "L") instead of the content. In this manner, a designer can choose not to display a certain element's content rather than have that element be clipped or configured for scrolling. Animation for such a transition may be performed.

Figure 8:
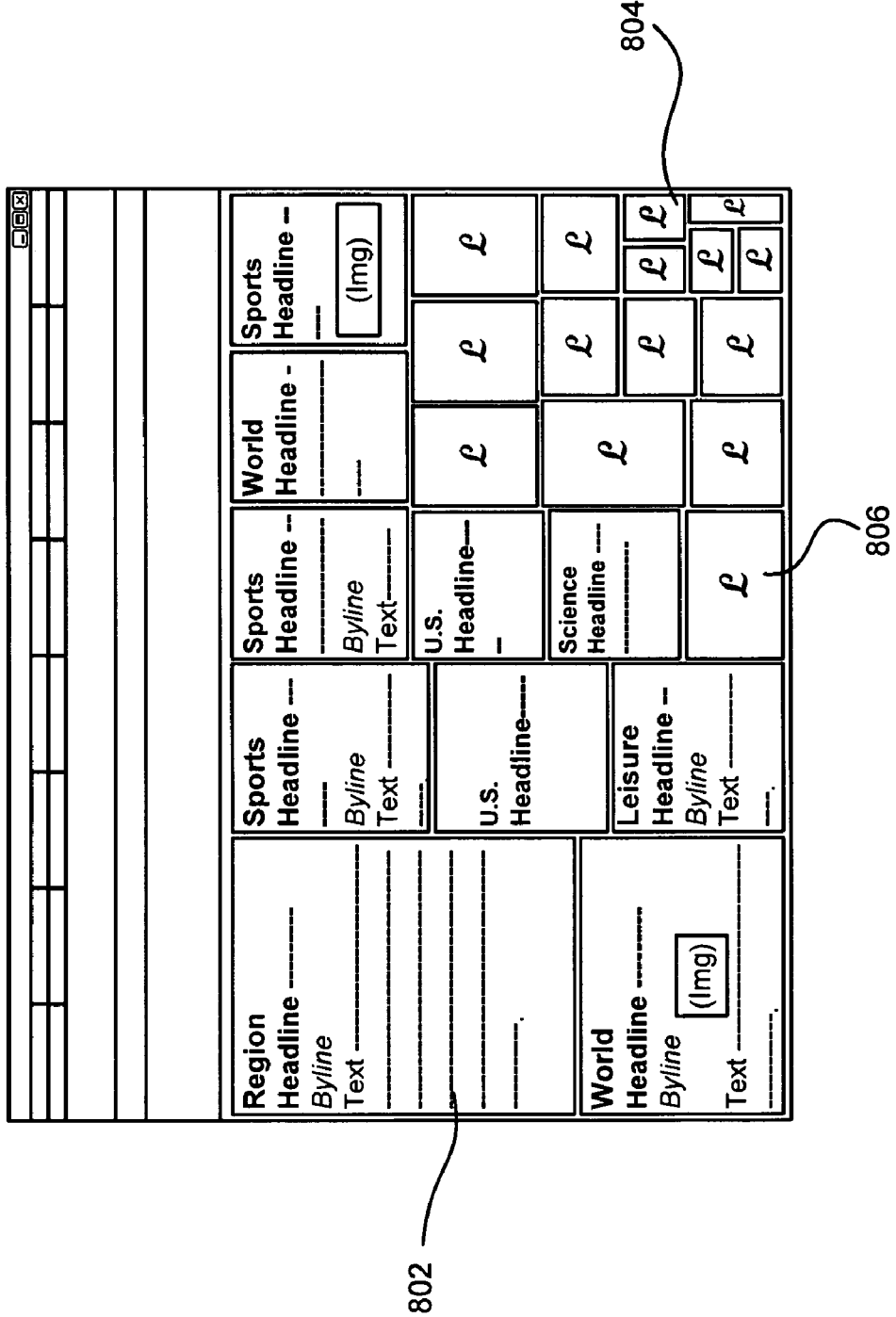
FIG. 8 is a representation of laid out elements in a second configuration after transitioning and other element processing.

As can be readily appreciated, resizing the panel can change the size of the panel's elements. For example, consider that FIG. 8 is a resized smaller version of FIG. 7. DynaPanel is called for a resize, as is DynaContentPresenter 230. As can be seen, an element such as the element 702 in FIG. 7 is slightly smaller in FIG. 8 but still represented with its content, whereas formerly content-filled element 706 in FIG. 7 is displayed as a logo image 806 in FIG. 8, because re-sizing has shrunk it below the threshold size as specified in the DynaDataTemplate 232.

Another aspect involves prioritizing the children that appear in a given parent space. Note that for most Windows® Presentation Foundation panels, if the children elements provided are too large for the given space, they either stretch beyond the bounds of the control, or they are clipped.

However, some scenarios want to show as much content as possible, yet do so without any clipping. To this end, a HideStackPanel control 234 is provided that displays the items it is given in order, top-to-bottom. Unlike a conventional StackPanel, HideStackPanel supports a priority (an attached property) for its children; if there is not sufficient room to place a child, the child with the lowest priority is hidden, then if necessary the next lowest, and so forth, ensuring that any child that is displayed is displayed in full. Further, HideStackPanel supports a "stretch" property on its children, whereby if a child has stretch defined, the child laid-out such that it fills any remaining space.

FIG. 7 exemplifies HideStackPanel 234, in which section headings and headlines are given a higher priority than bylines and text. Thus, as in element 702 when there is sufficient room for all content, all content is displayed. In contrast, as in element 706, only the section heading and headline appear. Section headings and headlines may be stretched to fill the area.

Exemplary Operating Environment

Figure 9:
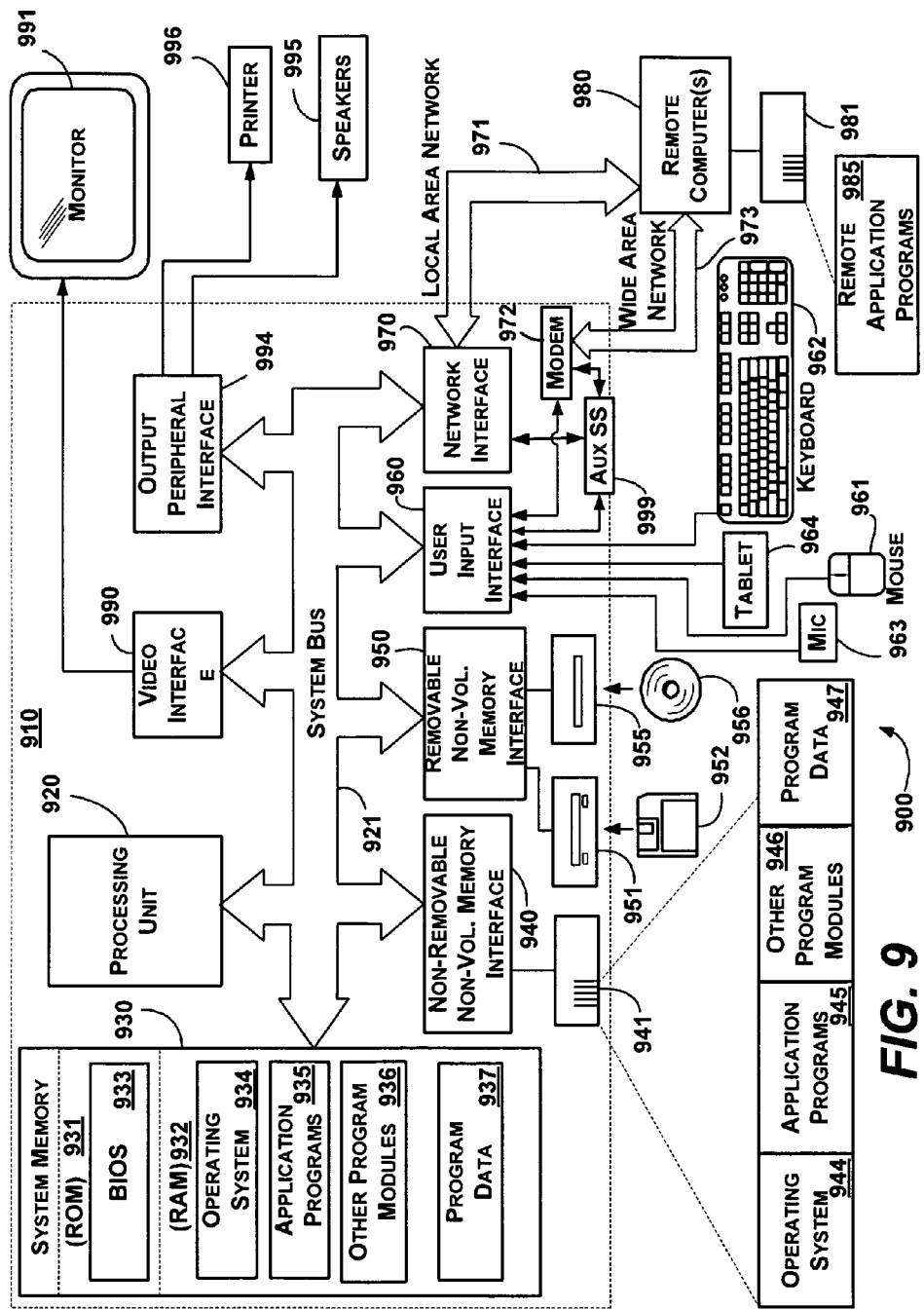
FIG. 9 shows an illustrative example of a general-purpose computing environment into which various aspects of the present invention may be incorporated.

FIG. 9 illustrates an example of a suitable computing system environment 900 on which layout animation subsystem (FIG. 2) may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a lower power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the invention is to cover all modifications, alternative constructions, and equivalents falling within the spirit and scope of the invention.

What is claimed is:

1. At least one computer storage medium having computer-executable instructions, which when executed enable a computing system to perform steps, comprising:
   receiving a request to reconfigure a set of elements into a new configuration, each element of the set having first layout data corresponding to an initial laid out state;
   determining second layout data for each element in the set of elements in the new configuration corresponding to a final laid out state, including
      selecting a first element of the set of elements, determining if the first element has sufficient size for outputting content, and if not, substituting another element for the first element or substituting content into the first element, for the final laid out state; and
   transitioning at least some of the elements from their initial laid out state to their final laid out state, including determining interim layout data corresponding to each frame of a series of frames such that the interim layout data provides an animation effect.

2. The at least one computer storage medium of claim 1 wherein determining the final layout data comprises communicating with a pluggable layout algorithm.

3. The at least one computer storage medium of claim 1 wherein the new configuration changes the location of the elements, and wherein transitioning at least some of the elements from their staffing layout data to their final layout data comprises computing interim location coordinates as the interim layout data.

4. The at least one computer storage medium of claim 1 wherein the new configuration changes the size of the elements, and wherein transitioning at least some of the elements from their starting layout data to their final layout data comprises computing interim size data as the interim layout data.

5. The at least one computer storage medium of claim 1 wherein the new configuration removes at least one element between the initial laid out state and the final laid out state, and wherein transitioning at least some of the elements from their staffing layout data to their final layout data comprises fading out each removed element by determining interim opacity layout data, or moving out each removed element by determining interim location layout data, or both fading out and moving out each removed element.

6. The at least one computer storage medium of claim 5 having further computer-executable instructions comprising, setting each removed element to a hidden state when the opacity layout data corresponds to the final layout data for that element, and reconfiguring the new configuration into another new configuration that excludes each element set to the hidden state.

7. The at least one computer storage medium of claim 1 wherein the new configuration adds at least one element between the initial laid out state and the final laid out state, and wherein transitioning at least some of the elements from their starting layout data to their final layout data comprises fading in each added element by determining interim opacity layout data, or moving in each added element by determining interim location layout data, or both fading in and moving in each added element.

8. The at least one computer storage medium of claim 1 wherein the new configuration corresponds to a sort operation that changes the locations of at least two elements between the initial laid out state and the final laid out state, and wherein transitioning at least some of the elements from their staffing layout data to their final layout data comprises computing interim location coordinates as the interim layout data for each element having a changed location.

9. The at least one computer storage medium of claim 1 wherein determining the second layout data comprises, selecting a second element of the set of elements, determining if the second element has sufficient size for all of its content, and if not, accessing priority data to include a subset of the content in the second element and exclude other content from the second element.

10. In a computing environment, a system comprising,
a control that computes interim layout data for at least some elements of a plurality of elements between an initial laid out state corresponding to a first configuration and a final laid out state corresponding to a second configuration, the control configured to select a first element of the plurality of elements, determine if the first element has sufficient size for all of its content in the second configuration, and if not, access priority data to include a subset of the content in the first element and exclude other content from the first element in the second configuration; and
rendering means coupled to the control for outputting a series of frames based upon varying interim layout data from the control to provide a visible representation of animation of the at least some of the elements between the first and second configurations.

11. The system of claim 10 further comprising a plurality of layout algorithms configured for coupling to the control, wherein the control obtains target layout data corresponding to the final laid out state from a selected one of the layout algorithms.

12. The system of claim 11 wherein the control comprises a dynamic panel control in a Windows® Presentation Foundation environment, and wherein the layout algorithms comprise dynamic panel layout components in the Windows® Presentation Foundation environment.

13. The system of claim 10 wherein the control computes interim location coordinates as the interim layout data to provide an animated movement effect, computes interim size data as the interim layout data to provide an animated resizing effect, or computes interim opacity data as the interim layout data to provide an animated fading effect, or computes any combination of interim location coordinates, interim size data, or interim opacity data.

14. The system of claim 10 further comprising, means for deferring computationally expensive layout operations until sufficient resources are available in the computing environment.

15. The system of claim 10 further comprising, means for changing the layout of an element's content based upon a priority among pieces of the content and the available size of the element.

16. The system of claim 10 wherein the control is further configured to select a second element of the plurality of elements, determine if the second element has sufficient size for outputting content, and if not, substitute another element of the plurality of elements for the second element or substitute content into the second element, for the final laid out state.

17. In a computing environment, a method comprising:
receiving a request to reconfigure a set of elements into a new configuration, each element of the set having first layout data corresponding to an initial laid out state;
determining second layout data for each element in the set of elements in the new configuration corresponding to a final laid out state, including,
a) for at least one element, determining whether the available size for that element is at least a minimum size, and if not, changing the visualization of that element; and
b) for at least one element, determining whether content of that element fits within the element, and if not, adjusting the element's content based upon a priority among pieces of the content, such that prioritized lesser amount of the content will be rendered in the element; and
transitioning at least some of the elements from their initial laid out state to their final laid out state at a computing system using a processing unit of the computing system, including determining interim layout data corresponding to each frame of a series of frames such that the interim layout data provides an animation effect.

18. The method of claim 17 wherein determining the interim layout data comprises computing interim location coordinates as the interim layout data to provide an animated movement effect, computing interim size data as the interim layout data to provide an animated resizing effect, or computing interim opacity data as the interim layout data to provide an animated fading effect, or computing any combination of interim location coordinates, interim size data, or interim opacity data.

19. The method of claim 17 further comprising, deferring computationally expensive layout operations until the elements are in the second configuration.

20. The method of claim 17 wherein for at least one element, determining whether the available size for that element is at least a minimum size, and if not, changing the visualization of that element comprises:
for at least one element, determining whether the available size for that element is at least a minimum size, and if not, substituting another element for that element or substituting content into that element.

* * * * *